United States Patent
Navalon Carretero

(10) Patent No.: US 7,934,491 B2
(45) Date of Patent: May 3, 2011

(54) HEATER MODULE FOR THE ADMISSION GASES OF AN AUTOMOBILE ENGINE WITH AN OVERHEATING PROTECTION AND/OR CLOSED-LOOP REGULATION

(75) Inventor: Herminio Navalon Carretero, Motilla del Palancar (ES)

(73) Assignee: Nagares, S.A., Madrid (ES)

( * ) Notice: Subject to any disclaimer, the term of this patent is extended or adjusted under 35 U.S.C. 154(b) by 919 days.

(21) Appl. No.: 11/814,477

(22) PCT Filed: Jan. 21, 2005

(86) PCT No.: PCT/ES2005/000026
§ 371 (c)(1),
(2), (4) Date: Jul. 20, 2007

(87) PCT Pub. No.: WO2006/079665
PCT Pub. Date: Aug. 3, 2006

(65) Prior Publication Data
US 2009/0038592 A1    Feb. 12, 2009

(51) Int. Cl.
*F02M 31/13* (2006.01)
(52) U.S. Cl. ........................ 123/549; 123/556
(58) Field of Classification Search .................. 123/549, 123/556, 543, 557
See application file for complete search history.

(56) References Cited

U.S. PATENT DOCUMENTS

| | | | | |
|---|---|---|---|---|
| 3,373,726 A | * | 3/1968 | Albrecht | 123/549 |
| 3,760,780 A | * | 9/1973 | Jordan | 123/549 |
| 4,308,845 A | * | 1/1982 | Sarto | 123/549 |
| 4,424,422 A | * | 1/1984 | Bell et al. | 219/205 |
| 4,754,741 A | * | 7/1988 | Houtman | 123/552 |
| 4,898,668 A | * | 2/1990 | Hodgkins et al. | 210/180 |
| 5,048,500 A | | 9/1991 | Curhan | |
| 5,094,198 A | | 3/1992 | Trotta et al. | |
| 5,988,146 A | | 11/1999 | Anderson et al. | |

(Continued)

FOREIGN PATENT DOCUMENTS

DE    10152643    6/2002

(Continued)

OTHER PUBLICATIONS

International Search Report for the priority application (PCT/ES2005/000026) completed Dec. 26, 1995 (mailed Dec. 29, 2005).

*Primary Examiner* — M. McMahon
(74) *Attorney, Agent, or Firm* — Knobbe Martens Olson & Bear LLP

(57) ABSTRACT

Incorporates at least one thermal switch (5) in series with the heating resistor (4) of the module located on the frame (1) of said resistors (4) that cuts off current to the resistor (4) when the heater power control circuit fails. The thermal switch (5) can be between the heating resistor (4) and the earth connection of the support (6), or between the heating resistor (4) and the power supply (3) of the module. The module allows a closed-loop control using as variable the temperature of one of the resistors (4), whose resistivity can change with the temperature. Similarly, the electronic control circuit can also be integrated in the heater frame (1), allowing a closed-loop control of the dissipated power using as control variable the temperature of the frame (1).

9 Claims, 2 Drawing Sheets

U.S. PATENT DOCUMENTS

| | | | |
|---|---|---|---|
| 6,152,117 A | 11/2000 | Prust | |
| 2002/0000221 A1 | 1/2002 | Kilb et al. | |
| 2002/0043234 A1 | 4/2002 | Homi | |
| 2002/0096155 A1* | 7/2002 | Thimmesch et al. | 123/543 |
| 2003/0056981 A1 | 3/2003 | Furukuwa | |
| 2005/0257781 A1* | 11/2005 | Linkenhoger | 123/549 |
| 2007/0039596 A1 | 2/2007 | Navalon Carretero | |

FOREIGN PATENT DOCUMENTS

| | | | |
|---|---|---|---|
| DE | 10238320 | 4/2003 | |
| GB | 2116809 A | 9/1983 | |
| JP | 62017357 | 1/1987 | |
| JP | 6257523 * | 9/1994 | 123/556 |
| WO | WO 2004/011795 A1 | 2/2004 | |
| WO | WO 2005/033499 A1 | 4/2005 | |

* cited by examiner

HEATER MODULE FOR THE ADMISSION GASES OF AN AUTOMOBILE ENGINE WITH AN OVERHEATING PROTECTION AND/OR CLOSED-LOOP REGULATION

RELATED APPLICATIONS

This application is a U.S. National Phase of International Application No. PCT/ES2005/000026, filed Jan. 21, 2005, designating the U.S. and published not in English on Aug. 3, 2006 as WO 2006/079665.

OBJECT OF THE INVENTION

The present invention relates to a heater module for the admission gases of an automobile thermal engine.

The object of the invention is to provide the heater module with protection means against overheating, as well as to incorporate a control in the heating means and for these means to allow a closed-loop regulation of the heater temperature.

BACKGROUND OF THE INVENTION

Patent PCT/ES03/00511 describes the problems related to designing an admission gas heater for automobile thermal engines, wherein a heater of this type can be used for the following functions:
  Aiding cold starts
  Aiding regeneration of the particles filter
  Aiding the reduction of polluting emissions
  while complying with the following requirements:
  Minimal load losses
  Short response times
  High power dissipation capability.

This document explains how these design requirements make it necessary to design heaters with dissipation resistors that must work at very high temperatures, so that in order to operate such a heater without overheating risks it is necessary to incorporate sensors for measuring the temperature of its support, which may be in contact with plastic materials that must not exceed a certain temperature, which for the plastics commonly used in the industry is on the order of 150° C. This heater module with an incorporated electronic temperature control allows managing the dissipated power efficiently according to said measurement and eliminates the risk of deformation or fire in the plastic parts in contact with the heater.

However, an analysis of the failure modes of this heater module reveals the following risks:
  1. In case of short-circuit of the power switch in the control circuit, the resistor will be constantly connected to the battery; if the heater module is mounted on a plastic collector nothing will prevent the temperature from rising continuously, deforming said collector due to overheating or setting fire to it, in turn resulting in an engine fire.
  2. The control embodied as described in the cited patent PCT/ES03/00511, is effective because it is based on the measurement of the support temperature and limits the power dissipated by the heating resistors in order to keep said temperature under a given safety value; however, this control has the added risk of the support being heated due to power dissipation in the power switches, so that the management of the power supplied to the air flow will be erroneous.

As regards the measurement of the resistor temperature, invention patent PCT/ES02/00369 describes a "system for controlling the temperature of the admission air in Diesel internal combustion engines" which claims a heater with resistors made by soldering to strips of different metal alloys such that they will dissipate power while, as they are made from the union of two different metals, their thermocouple function will allow knowing the resistor temperature. However, a heater manufactured with resistors of this type does not reduce the aforementioned risk of a poor operation of the control circuit and overheating, with the resulting risk of fire.

DESCRIPTION OF THE INVENTION

The heater module object of this invention proposes to eliminate the above-described risks, increasing the safety and reliability of modules of this type implemented in engines, by incorporating a heat switch in series in the module heating resistors and mounting resistors with a positive thermal coefficient.

To eliminate the risk of overheating due to a short-circuit of the heater module power switches or a malfunction of the control electronics related to the temperature measurement, the control signal, etc., it is foreseen that the module incorporate a thermal switch in series with the heating resistor, whether at its earth connection or at its power connection, which cuts off current to the resistor in case of said control circuit malfunction, this is, when the temperature of the thermal switch, which is the same as that of the support of the heater module in which it is integrated and to which it is thermally connected, is higher than the actuation temperature of the fuse.

On another hand, to eliminate the risk of the support overheating due to an excessive power dissipation not by the resistors but by the power switch itself (degraded operation of the power switch), and of an incorrect power supply to the air flow because the control believes that the overheating is due to an excessive power dissipation by the resistors that cannot be evacuated by the air flow, a system is implemented that measures the temperature of said resistors.

To measure this temperature, what is proposed is specifically to manufacture the resistors using a material with a non-constant thermal coefficient or by joining to segments, one with a resistance that does not change with the temperature and another which does, so that measuring the ohmic value of each resistor allows knowing its temperature.

The use of resistors with a positive thermal coefficient (PTC) allows, on one hand, knowing the temperature of the resistors (by measuring their ohmic value) and on another hand automatically limits the dissipated power (as the resistor temperature increases its ohmic value rises and the dissipated power falls).

Fitting thermal switches in series with the resistors ensures that in case of a control circuit failure (such as a short-circuit of the power switches) so that the resistors are permanently connected to the battery without air flow (engine stopped), the temperature of the hottest points of support will not exceed the working temperature of the plastics that may be in contact with it (when the heater is mounted on a plastic collector).

The thermal switch is located on the resistor support and is thermally connected to it so that its temperature is the same as that of the support. The switch cuts off current to the resistors when its temperature exceeds a predetermined value.

Several types of thermal switches are available in the market. These can be divided into two groups: reversible switches, among which are PTCs and bimetallic switches; and non-reversible switches, such as thermal fuses. Switches of both of these types are devices that do not dissipate power, and therefore their temperature increase is due exclusively to the increase in ambient temperature, as opposed to standard fuses, which are power-dissipating elements.

From a safety point of view, a heater that includes both of these innovations (heat switches in series with the resistors and PTC type resistors) does not require that the control circuit be mounted on the same support as the resistors, although in absence of a direct measurement of the temperature of said support the responsibility for its control will fall on the thermal switch.

In this case the system may consist of a heater with one or more resistors, depending on the engine requirements, and an electronic control module electrically connected to the heater by cabling through which the resistors are powered from the control board. This scheme would be appropriate for cases in which space limitations or other restrictions in its physical implementation in the engine prevent using a heater with incorporated electronics.

It is worth mentioning and emphasising that even by adding the two improvements described above, a module with incorporated control will have several advantages, among which are the following:

As the support temperature measurement is available, it is possible to control the power dissipated before the heat switch is actuated, unlike the solution that incorporates only a thermal fuse, which is an irreversible device that renders the part useless and requires the vehicle to be serviced in a garage.

The cost of a module including the heating resistors and the control module is lower than that of a system incorporating the components separately: heater, control circuit and cabling. This is truer considering that the cabling will require sealed power connectors.

The cost of assembly in an engine is higher for a system with three components (heater, cabling, control module).

In short, it is proposed to manufacture heaters either with the control electronics integrated in the same support or otherwise, incorporating in any case a thermal switch in series with each heating resistor that can be interposed between the resistor and its earth connection or between the resistor and its connection to the power cable. In addition, if the heating resistors have a PTC behaviour, a closed-loop control can be established using as a variable the temperature of the resistors themselves.

For the resistors to have said PTC behaviour, they must be either manufactured with a single wire or ribbon segment of a PTC type material or with two or more segments of wire or ribbon connected to each other, with at least one of them being of a PTC type material.

Several possible embodiments of the heater are considered, in all of which the thermal switch is soldered in series at one of the ends of the resistor and embedded in the metallic support of said resistors, which are electrically insulated from said support by ceramic insulators which simultaneously act as a thermal union between the resistor and the support. The resistors may consist of:

a) A single resistive segment in the form of a wire or ribbon, of a metal alloy with a resistivity that does not change with the temperature;
b) A single resistive segment in the form of a wire or ribbon, of a metal alloy with a resistivity that does change with the temperature;
c) Two resistive segments in the form of a wire or ribbon, soldered to each other, one made of a metal alloy with a resistivity that does not change with the temperature and the other made of a metal alloy with a resistivity that does change with the temperature.

The resistors included in the heater do not necessarily have to be of the same type. For example, a heater with 4 resistors may incorporate:

A first resistor of an alloy whose resistance does not change with the temperature;
A second resistor of an alloy whose resistance does change with the temperature;
A third resistor made of two segments soldered to each other, one made of a metal alloy with a resistivity that does not change with the temperature and the other made of a metal alloy with a resistivity that does change with the temperature;
A fourth resistor identical to one of the above three;
Incorporating a thermal switch soldered in series with each resistor and embedded in the metallic support of said resistors.

DESCRIPTION OF THE DRAWINGS

To complete the description being made and in order to aid a better understanding of the characteristics of the invention, according to a preferred example of embodiment, a set of drawings is accompanied as an integral part of the description where, for purposes of illustration only and in a non-limiting sense the following is shown.

PREFERRED EMBODIMENT OF THE INVENTION

Figure 1:
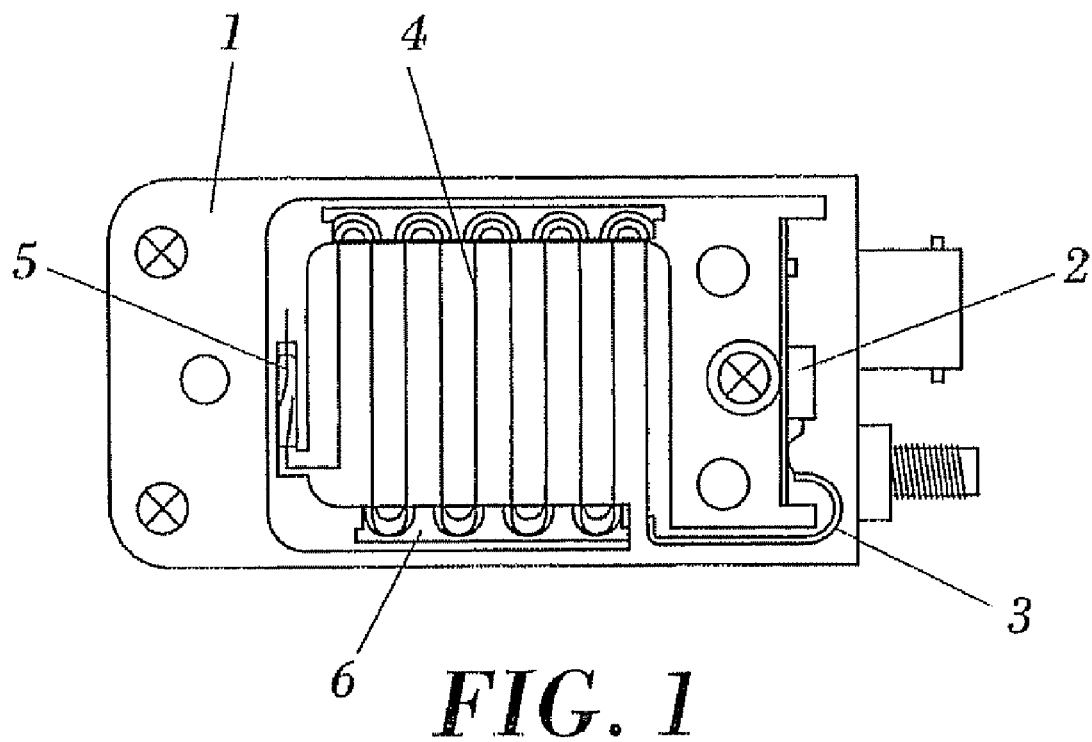
FIG. 1 represents an elevation view of the heater module for the admission gases of an automobile engine that shows the thermal switch placed between the resistor and its earth connection.

The heater module for the admission gases of an automobile engine that constitutes the object of this invention is of the type incorporating a frame (1) and a power control circuit that is provided with at least one power switch (2) that controls the power supply (3) to at least one heating resistor (4) mounted on a ceramic support (6) that heats the engine admission gases, and is provided with an overheat protection system and/or closed-loop regulation based on the temperature measurement of the frame (1) and/or the temperature of the resistor (4).

Figure 2:
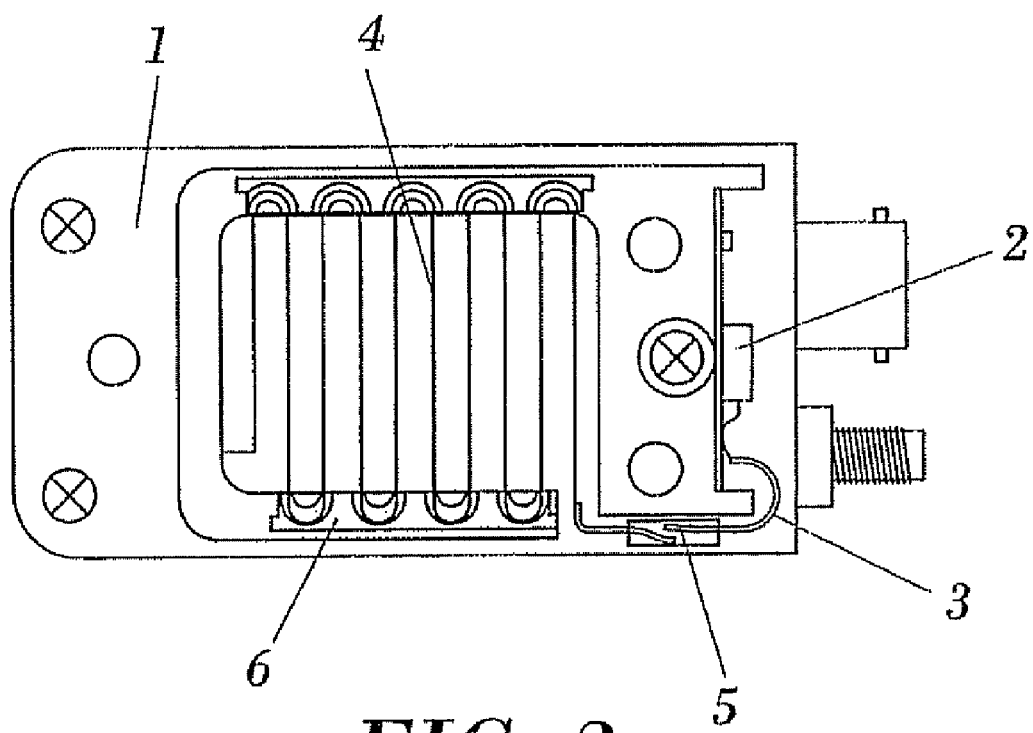
FIG. 2 represents an elevation view of the heater module for the admission gases of an automobile engine that shows the thermal switch placed between the resistor and its power connection.

Based on this basic design, the heater module mainly stands out in that it incorporates at least one thermal switch (5) in series with the heating resistor (4) placed on the frame (1) of said heating resistors (4) which cuts off current to the resistor (4) when a short-circuit occurs in the power switch, said thermal switch (5) located between the heating resistor (4) and the earth connection of the frame (1), as shown in FIG. 1, or between the heating resistor (4) and the power supply (3), as shown in FIG. 2.

Figure 3:
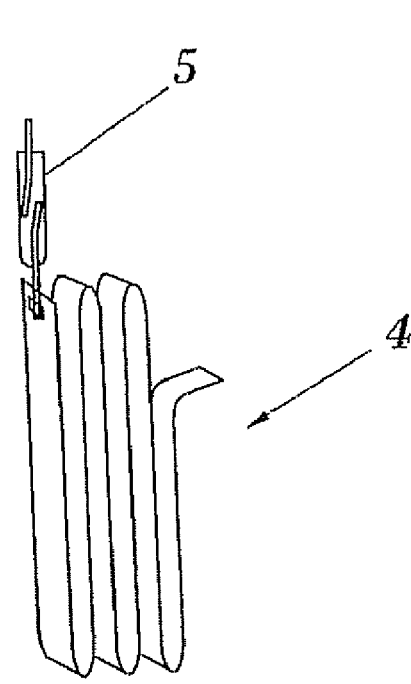
FIG. 3 represents a perspective view of a resistor that is provided with a thermal switch on one of its ends consisting of a ribbon that can have a positive or constant thermal coefficient.

The heating resistors (4) can consist of a single resistive segment in the form of a wire or ribbon of an alloy whose resistivity may or may not vary with the temperature, as shown in FIG. 3.

Preferably, a heating resistor (4) will be used with a positive thermal coefficient (PTC), this is, one whose resistivity changes positively with the temperature, allowing a closed-loop control using as the control variable the temperature of the heating resistors (4).

Figure 4:
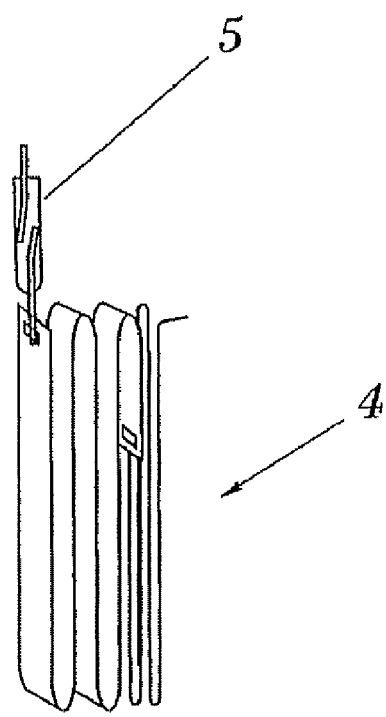
FIG. 4 represents a perspective view of a resistor that is provided with a thermal switch on one of its ends consisting of a ribbon with a constant thermal coefficient combined with a wire of positive thermal coefficient.
Figure 5:
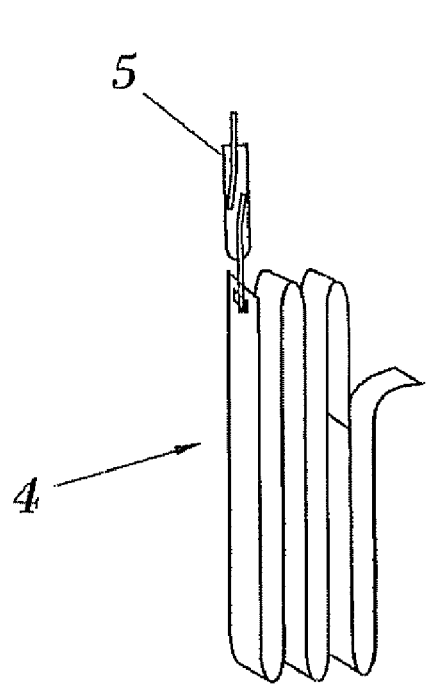
FIG. 5 represents a perspective view of a resistor provided on one of its ends with a thermal switch consisting of a ribbon with a constant thermal coefficient combined with a ribbon with a positive thermal coefficient.
Figure 6:
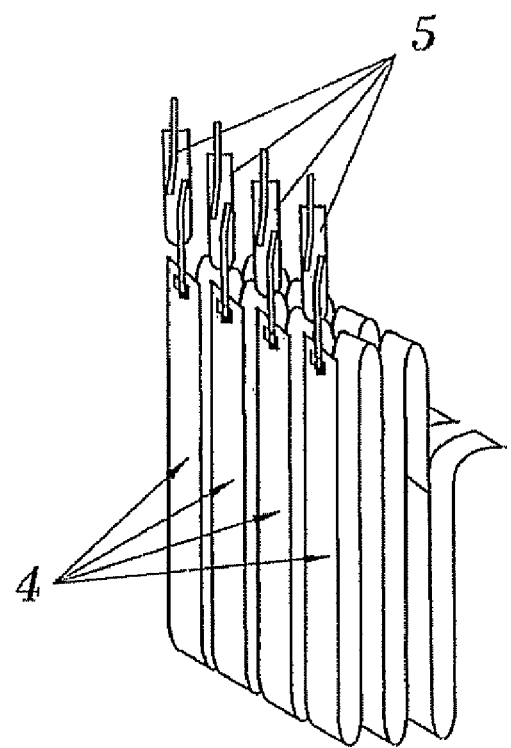
FIG. 6 represents a group of resistors of several types, each of which provided with a thermal switch.

Similarly, the heating resistors (4) can consist of two resistive segments in the form of a wire or ribbon, soldered to each other, one of which is made of a metal alloy whose resistivity does not change with the temperature and the other is made of an alloy whose resistivity does change with the temperature, as shown in FIGS. 3 and 4.

The heater can incorporate combinations of heating resistors (4) of different types, such as resistors (4) with a resistivity that changes with the temperature and others whose resistivity does not change with temperature, each of which may consist of one or several segments.

As the heating resistors (4) incorporate a thermal protection in the form of the thermal switches (5) disposed in series, the possibility is considered that the heater incorporate the power control circuit (2) separate from the frame (1) and connected to it by a cable.

The invention claimed is:

1. Heater module for the admission gases of an automobile engine with an overheating protection and/or closed-loop regulation, said module comprising:
    a frame; and
    a power control circuit provided with at least one power switch that controls the power supply to at least one heating resistor mounted electrically insulated from the frame by ceramic supports, said at least one heating resistor heating the engine admission gases, wherein said power control circuit is configured to control operation of the heater module based on the measurement of the temperature of the frame and/or the temperature of the heating resistor,
    wherein said module further comprises at least one thermal switch in series with the heating resistor, said thermal switch placed on the frame and arranged to cut off current to the heating resistor when there is an excessive heating of the frame that the control circuit cannot limit.

2. Heater module according to claim 1, wherein said thermal switch is located between the heating resistor and the earth connection of the frame.

3. Heater module according to claim 1, wherein said thermal switch is located between the heating resistor and the power supply.

4. Heater module according to claim 1, wherein said heating resistors consist of a resistive segment of an alloy whose resistivity varies with temperature.

5. Heater module according to claim 1, wherein said heating resistors are made of two soldered resistive segments, one of which consists of a metal alloy whose resistivity does not change with temperature while the other consists of an alloy whose resistivity changes with temperature.

6. Heater module according to claim 1, wherein said module incorporates combinations of heating resistors whose resistivity changes with temperature and others whose resistivity does not change with temperature and formed by at least one segment.

7. Heater module according to claim 1, wherein said heater module is mounted on a plastic collector for the admission gasses of an automobile engine.

8. Heater module for the admission gases of an automobile engine with an overheating protection and/or closed-loop regulation, said module comprising:
    a frame; and
    a power control circuit provided with at least one power switch that controls the power supply to at least one heating resistor mounted electrically insulated from the frame by ceramic supports, said at least one heating resistor heating the engine admission gases, wherein said power control circuit is configured to control operation of the heater module based on the measurement of the temperature of the frame and/or the temperature of the heating resistor,
    wherein said module further comprises at least one thermal switch in series with the heating resistor, said thermal switch placed on the frame and arranged to cut off current to the heating resistor when there is an excessive heating of the frame that the control circuit cannot limit; and
    wherein said heating resistors are made of two soldered resistive segments, one of which consists of a metal alloy whose resistivity does not change with temperature while the other consists of an alloy whose resistivity changes with temperature.

9. Heater module for the admission gases of an automobile engine with an overheating protection and/or closed-loop regulation, said module comprising:
    a frame; and
    a power control circuit provided with at least one power switch that controls the power supply to at least one heating resistor mounted electrically insulated from the frame by ceramic supports, said at least one heating resistor heating the engine admission gases, wherein said power control circuit is configured to control operation of the heater module based on the measurement of the temperature of the frame and/or the temperature of the heating resistor,
    wherein said module further comprises at least one thermal switch in series with the heating resistor, said thermal switch placed on the frame and arranged to cut off current to the heating resistor when there is an excessive heating of the frame that the control circuit cannot limit; and
    wherein said module incorporates combinations of heating resistors whose resistivity changes with temperature and others whose resistivity does not change with temperature and formed by at least one segment.

* * * * *